US008004236B2

United States Patent
Chen et al.

(10) Patent No.: US 8,004,236 B2
(45) Date of Patent: Aug. 23, 2011

(54) CONTACTLESS CHARGING DEVICE AND CONTACTLESS CHARGING METHOD

(75) Inventors: Po-Shen Chen, Taipei County (TW); Chin-Tao Huang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 486 days.

(21) Appl. No.: 12/344,428

(22) Filed: Dec. 26, 2008

(65) Prior Publication Data
US 2010/0123429 A1    May 20, 2010

(30) Foreign Application Priority Data

Nov. 14, 2008   (TW) .................................. 97144036 A

(51) Int. Cl.
*H02J 7/00*     (2006.01)
*H02J 7/04*     (2006.01)
(52) U.S. Cl. ...................... 320/108; 320/140; 320/142
(58) Field of Classification Search .................... 320/108
See application file for complete search history.

(56) References Cited

U.S. PATENT DOCUMENTS
2008/0304292 A1 *   12/2008   Zeng et al. ................. 363/21.12
* cited by examiner

*Primary Examiner* — Edward Tso
*Assistant Examiner* — Johali Torres Ruiz

(57) ABSTRACT

A contactless charging device and contactless charging method is provided. The contactless charging device includes an energy-storing device for providing a DC signal as an input power, a power module electrically connected to the energy-storing device for generating an output signal in response to the DC signal and a control signal. The power module includes a transformer primary winding for coupling the output signal to a transformer secondary winding located external to the contactless charging device. The charging device further includes a feedback controller electrically connected to the power module for generating the control signal in response to the output signal, a predetermined power and a predetermined phase. When the contactless charging device is in close proximity to a plurality of loads, the output signal at the transformer primary winding will be coupled to the transformer secondary windings of the plurality of loads so as to simultaneously charge the loads.

11 Claims, 3 Drawing Sheets

CONTACTLESS CHARGING DEVICE AND CONTACTLESS CHARGING METHOD

BACKGROUND OF THE INVENTION

1. Field of the Invention

The present invention relates to a contactless charging device, and in particular relates to a contactless charging device for simultaneously charging a plurality of loads and method thereof.

2. Description of the Related Art

A contactless charging technique is generally used to charge a portable load. Its principle is to employ a transformer having a primary winding and secondary winding that are separated as a coupling interface. When a transformer primary winding and a transformer secondary winding are in close proximity with each other (namely a charging device and a portable load are in close proximity with each other), then the power is delivered from the primary winding to the secondary winding. FIG. 1 is a schematic diagram illustrating a conventional contactless charging device 100 and a portable charged load S100. The power supply of the charging device can be a single-phase AC power supply or a three-phase AC power supply 110. The AC supply 110 is input to the rectifier and voltage regulator and then converted to a high frequency AC signal through a converter 120. After that, the transformer primary winding 130 couples the high frequency signal to the secondary winding S130 of the transformer connected to the portable charged load S100 which is external to the charging device 100. Finally, the signal at the transformer's secondary winding is converted through another rectifier and voltage regulator to charge a battery S110 inside the portable charged load S100.

For a contact charging device or a contactless charging device, before a portable load such as an electrical automobile or a robot runs out of their power, they will return to a charging station or a location provided with power supply to be charged. If a portable load stops working due to the working environment or accidental breaking down of the power supply, the load will be immobile without the power. In this case, the load can only to be towed away to a charging station. Moreover, the characteristic of a conventional contactless charging device is to charge only one load at one time, as the prior art shows in FIG. 1. If a charging device has the ability to charge a plurality of loads, the efficiency would be enormously improved.

To solve abovementioned problem and promote charging efficiency, it is necessary to provide a contactless charging device having advantages of portability and simultaneously charging a plurality of loads.

BRIEF SUMMARY OF INVENTION

A detailed description is given in the following embodiments with reference to the accompanying drawings.

In one aspect, the present invention provides a contactless charging device. The contactless charging device comprises: an energy-storing device for providing a DC signal as an input power; a power module electrically connected to the energy-storing device for generating an output signal in response to the DC signal and a control signal, wherein the power module further comprises a transformer primary winding for coupling the output signal to the transformer's secondary winding located external to the contactless charging device; and a feedback controller electrically connected to the power module for generating the control signal in response to the output signal, a predetermined power and a predetermined phase; wherein when the contactless charging device is in close proximity to a plurality of loads, the output signal at the transformer primary winding of the charging device will be coupled to the transformers secondary winding of the plurality of loads so as to simultaneously charging the loads.

In another aspect, the present invention provides a contactless charging method. The method comprises the steps of: generating an output signal; determining whether a contactless charging device is in close proximity to a charged load according to the output signal to determine whether to perform charging; performing phase lock control according to the output signal and a predetermined phase; performing power control according to the output signal and a predetermined power; coupling the output signal to transformers secondary windings of a plurality of loads through the transformer primary winding of the contactless charging device to simultaneously charge the plurality of loads.

The abovementioned contactless charging device and contactless charging method have the advantage of being able to simultaneously charge a plurality of loads. Additionally, the contactless charging device can be portable

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
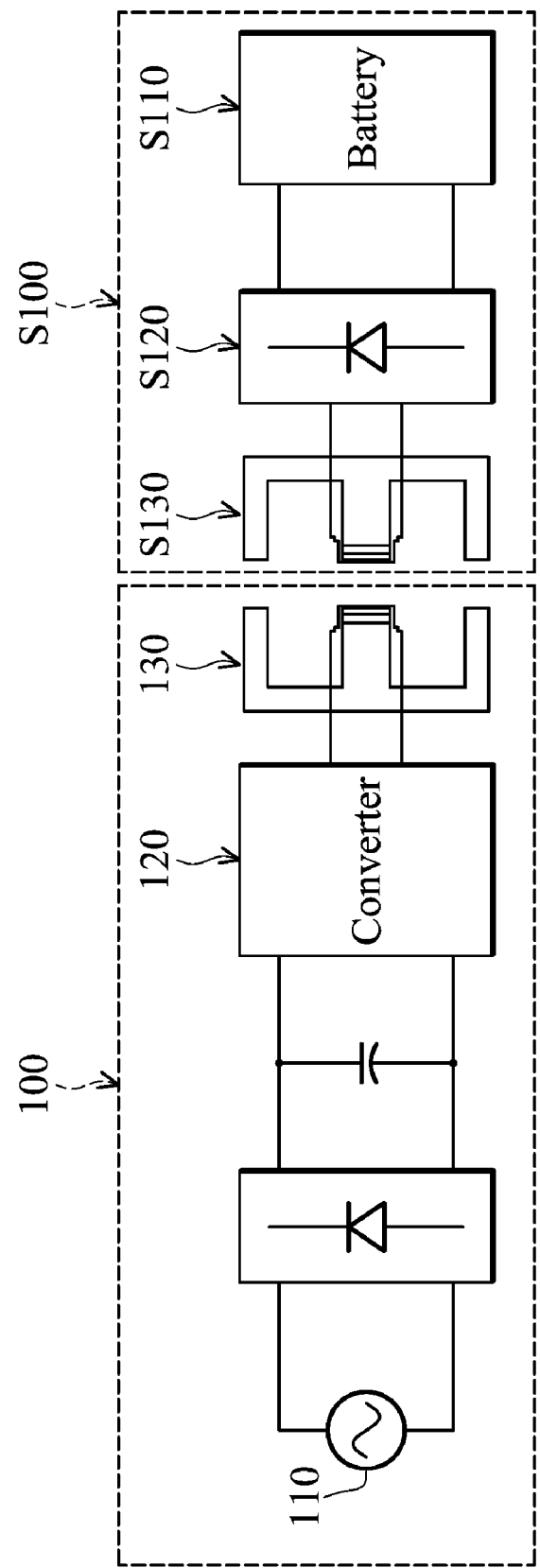
FIG. 1 is a schematic diagram showing the structure of a conventional contactless charging device.
Figure 2:
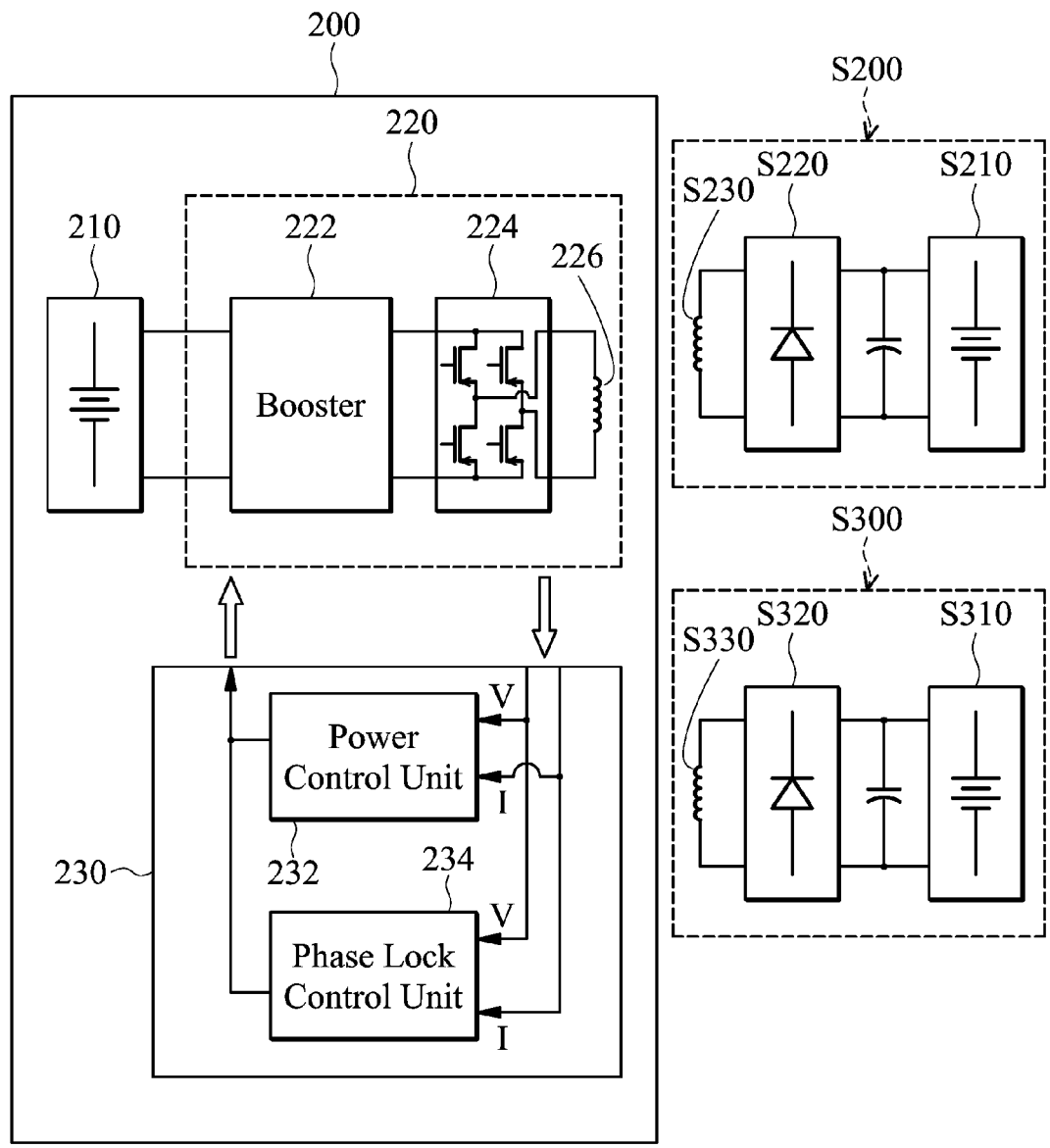
FIG. 2 is a schematic diagram showing the structure of the contactless charging device of the present invention.

FIG. 2 is a schematic diagram showing the structure of the contactless charging device of the present invention. The contactless charging device 200 comprises an energy-storing device 210, such as a portable energy-storing device in the embodiment of the present invention, a power module 220 and a feedback controller 230.

The portable energy-storing device 210 is generally a power supply which is portable and is able to output direct current (DC) voltage, such as a battery. The power module 220 comprises a booster 222, a converter 224 and a transformer primary winding 226. The booster 222 is used to raise the DC voltage provided by the portable energy-storing device to a predetermined level. The converter 224 which is controlled by a control signal converts the raised DC voltage to an alternating current (AC) output signal. The AC output signal which comprises an AC voltage signal and an AC current signal is coupled through the transformer primary winding 226 to a transformer secondary winding which is externally located to the contactless charging device 200. The converter 224 herein is a circuit which is composed of transistors, but is not limited thereto. A feedback controller 230 electrically connected to the power module 220 for generating a control signal to control the converter 224 according predetermined parameters such as power value and phase value, and real output power and real phase relative to the output signal.

The feedback controller 230 includes power control unit 232 and phase lock control unit 234 in accordance with the embodiment of the present invention. The power control unit 232 extracts the voltage and current signal from the transformer primary winding 226 to calculate present output power for the power module 220, and then evaluates and derives an optimized power control parameter according to the present output power and a predetermined power provided for a transformer secondary winding. The phase lock control unit 234 compares the output signal phase with a predetermined phase value provided for the transformer secondary winding to calculate an optimized phase control parameter. Next, an optimized control signal according to the power control parameter and the phase control parameter is generated. The control signal is used to control the converter 224 in the power module 220 to produce an optimized AC output signal which is able to appropriately be coupled to the transformer secondary winding to reach the required load charging.

If there are several loads which need to be charged, such as loads S200 and S300, as long as the contactless charging device 200 is in close proximity to the loads, the feedback controller 230 can still control the power module 220 to regulate the characteristic of the output signal based on the loads requirements so that the transformer primary winding 226 can simultaneously couple the output signal to the transformer secondary windings S230, S330 of the loads. Finally, the coupled signals at the secondary winding S230, S330 are both processed through a rectifier and a voltage regulator S220, S320, and then delivered to charge batteries S210, S310 in each load to achieve efficient charging.

Figure 3:
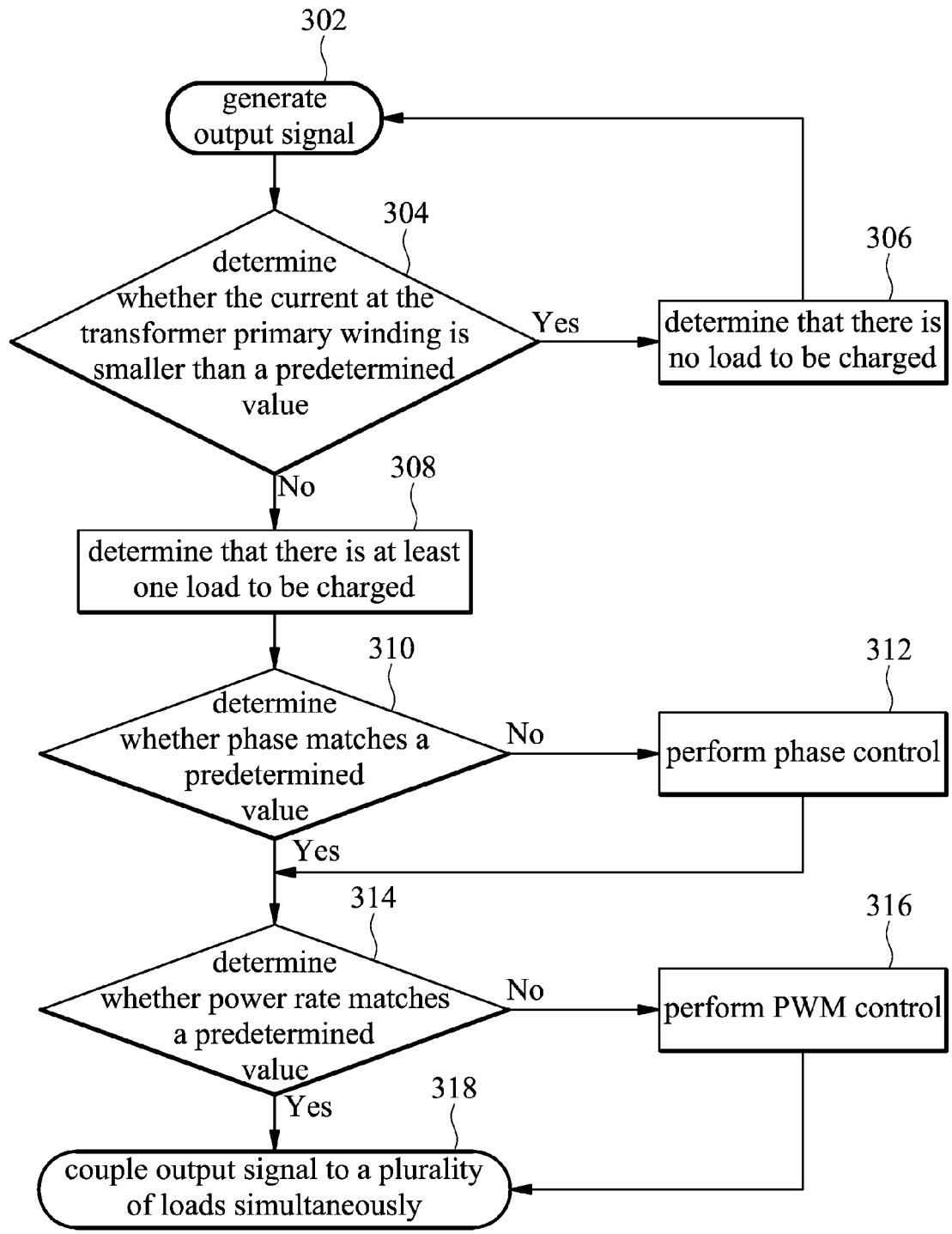
FIG. 3 is a flowchart illustrating the contactless charging method according to the embodiment of the present invention.

FIG. 3 is a flowchart illustrating the contactless charging method according to an embodiment of the present invention. Flow begins at block 302. At block 302, the contactless charging device 200 generates an output signal. When the portable energy-storing device 210 in the contactless charging device 200 supplies a DC voltage to the power module 220, the power module 220 generates an output signal by raising the voltage level and voltage conversion, which comprises an output voltage signal and an output current signal. Flow proceeds to block 304. At block 304, the contactless charging device 200 determines whether the current at the transformer primary winding 226 is smaller than a predetermined value. The magnitude of the current signal at the transformer's primary winding 226 is gauged to determine whether any load is in need of charging. A small amount of current will always exist at the transformer primary 226, even if the charging device 200 is not coupling a signal. For this reason, if the current signal at the transformer primary winding 226 is smaller than a predetermined value, flow proceeds to block 306. At block 306, it is determined that there is no load to be charged. Namely the contactless charging device 200 is not near to any transformer secondary winding, or will not intend to perform charging. If the current amount exceeds the predetermined value, it means that the charging device 200 is in close proximity to at least a load prepared for charging. At this time, flow proceeds to block 308. At block 308, it is determined that there is at least one load to be charged. Namely at least a transformer secondary winding is prepared for charging. As such, the next step proceeds to block 310. At block 310, the feedback controller 230 determines whether a phase matches a predetermined value. The feedback controller 230 extracts a voltage signal and a current signal at the transformer primary winding 226, and compares their phase with a predetermined phase value i.e., the phase value required by any load to determine whether the phase is appropriate for charging. If not, flow proceeds to block 312. At block 312, the controller 230 performs phase lock control to regulate an output signal phase to reach the predetermined value. Next, flow proceeds to block 314. At block 314, the controller 230 determines whether a power rate matches a predetermined value. The feedback controller 230 picks up the current signal and the voltage signal to calculate the power rate at the transformer primary winding 226, and then comparing the power rate with the predetermined power value i.e. the power value required by any load to determine whether the power is appropriate for charging If not, flow proceeds to block 316. At block 316, the feedback controller 230 performs power control such as PWM to regulate output power to reach the requirement.

Next, flow proceeds to block 318. At block 318, the charging device 200 simultaneously couples output signal to a plurality of loads. The power parameter and the phase parameter are regulated to the optimized values under operation of the feedback controller 230, so the control signal is resent to the power module 220 to control the converter 224. The converter 224 therefore produces a new output signal with new phase and an output power which match the requirement for any load. At this time, the output signal from the transformer primary winding 226 coupled to the transformer secondary winding just achieves charging effect. During charging of one load, the charging device 200 fixed this control signal at a stable value. Even if there is no feedback controller 230, the charging device 200 will still work properly. Should there be a plurality of loads or decreasing or increasing loads, necessary phase and power are adjusted. The feedback controller 230 adjusts the control signal according to the loads to make the transformer suitably couple the output signals.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A contactless charging device, comprising:
   an energy-storing device for providing a direct current (DC) signal as an input power;
   a power module, electrically connected to the energy-storing device for generating an output signal in response to the DC signal and a control signal, wherein the power module further comprises a transformer primary winding for coupling the output signal to a transformer secondary winding located external to the contactless charging device; and
   a feedback controller, electrically connected to the power module for generating the control signal in response to the output signal, a predetermined power and a predetermined phase;
   wherein when the contactless charging device is in close proximity to a plurality of loads, the output signal at the transformer primary winding of the contactless charging device will be coupled to the transformer secondary winding of the plurality of loads so as to simultaneously charging the loads.

2. The contactless charging device as claimed in claim 1, wherein the energy-storing device comprises a portable energy-storing device.

3. The contactless charging device as claimed in claim 2, wherein the portable energy-storing device comprises a battery.

4. The contactless charging device as claimed in claim 1, wherein the power module further comprises a booster for raising DC signals and a converter for converting DC signals to alternating current (AC) signals.

5. The contactless charging device as claimed in claim 1, wherein the feedback controller further comprises a phase lock control unit for adjusting the control signal in response to the phase of the output signal and a predetermined phase.

6. The contactless charging device as claimed in claim 1, wherein the feedback controller further comprises a power control unit for adjusting the control signal in response to the power of the output signal and a predetermined power.

7. The contactless charging device as claimed in claim 1, wherein the output signals comprises an AC voltage signal and an AC current signal.

8. A contactless charging method, comprising:
generating an output signal;
determining whether a contactless charging device is in close proximity to any chargeable load according to the output signal to determine whether to perform charging;
performing phase lock control according to the output signal and a predetermined phase;
performing power control according to the output signal and a predetermined power; and
coupling the output signal to transformers secondary windings of a plurality of loads through the transformer primary winding of the contactless charging device to simultaneously charge the plurality of loads.

9. The contactless charging method as claimed in claim 8, wherein the determining whether a contactless charging device is in close proximity to a charged load comprises checking the magnitude of the current signal for the output signal, and if the magnitude is smaller than a predetermined value, determining that there is no chargeable load in close proximity to the contactless charging device.

10. The contactless charging method as claimed in claim 8, wherein the performing phase lock control comprises adjusting the phase of the output signal in response to the phase of the output signal and a predetermined phase.

11. The contactlessly charging method as claimed in claim 8, wherein the performing power control comprises adjusting the power generated at the primary winding in response to the power at the primary winding calculated by the output signal and a predetermined power.

* * * * *